United States Patent
Salah et al.

(10) Patent No.: US 11,556,265 B2
(45) Date of Patent: Jan. 17, 2023

(54) UNIFIED HOST-BASED DATA MIGRATION

(71) Applicant: EMC IP Holding Company LLC, Hopkinton, MA (US)

(72) Inventors: Ahmed Salah, Giza (EG); Mohammed Omar, Cairo (EG)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/151,447

(22) Filed: Jan. 18, 2021

(65) Prior Publication Data
US 2022/0229572 A1 Jul. 21, 2022

(51) Int. Cl.
G06F 3/00 (2006.01)
G06F 3/06 (2006.01)
G06F 9/54 (2006.01)

(52) U.S. Cl.
CPC .......... G06F 3/0647 (2013.01); G06F 3/0604 (2013.01); G06F 3/0683 (2013.01); G06F 9/541 (2013.01)

(58) Field of Classification Search
None
See application file for complete search history.

(56) References Cited

U.S. PATENT DOCUMENTS 11,175,828 B1* 11/2021 Rao .................. G06F 3/0611
2014/0040410 A1* 2/2014 McDowell ........... G06F 3/0659
709/212
2019/0332308 A1* 10/2019 Feng .................... G06F 3/0635

* cited by examiner

Primary Examiner — Midys Rojas
(74) Attorney, Agent, or Firm — Ryan, Mason & Lewis, LLP

(57) ABSTRACT

Methods, apparatus, and processor-readable storage media for unified host-based data migration are provided herein. An example computer-implemented method includes identifying a first storage array and a second storage array associated with a host device; determining a set of characteristics related to the host device for migrating data from the first storage array to the second storage array; and migrating the data based at least in part on the set of characteristics, wherein the migrating comprises: creating a set of target devices on the second storage array and provisioning the set of target devices to the host device; and moving the data from a set of source devices on the first storage array to the target devices on the second storage array.

20 Claims, 6 Drawing Sheets

400 — IDENTIFY A FIRST STORAGE ARRAY AND A SECOND STORAGE ARRAY ASSOCIATED WITH A HOST DEVICE

402 — DETERMINE A SET OF CHARACTERISTICS RELATED TO THE HOST DEVICE FOR MIGRATING DATA FROM THE FIRST STORAGE ARRAY TO THE SECOND STORAGE ARRAY

404 — MIGRATE THE DATA BASED AT LEAST IN PART ON THE SET OF CHARACTERISTICS BY AT LEAST: CREATING A SET OF TARGET DEVICES ON THE SECOND STORAGE ARRAY AND PROVISIONING THE SET OF TARGET DEVICES TO THE HOST DEVICE, AND MOVING THE DATA FROM A SET OF SOURCE DEVICES ON THE FIRST STORAGE ARRAY TO THE TARGET DEVICES ON THE SECOND STORAGE ARRAY

UNIFIED HOST-BASED DATA MIGRATION

FIELD

The field relates generally to information processing systems, and more particularly to storage in such systems.

BACKGROUND

Data migration generally refers to the process of transferring data from one storage resource to another. Traditional data migration approaches are often complex and typically require detailed knowledge of different operating systems and volume managers. Additionally, such data migrations can cause service interruptions and/or require down time.

SUMMARY

Illustrative embodiments of the disclosure provide techniques for unified host-based data migration. An exemplary computer-implemented method includes identifying a first storage array and a second storage array associated with a host device; determining a set of characteristics related to said host device for migrating data from the first storage array to the second storage array; and migrating the data based at least in part on the set of characteristics, wherein said migrating comprises: creating a set of target devices on the second storage array and provisioning the set of target devices to the host device; and moving the data from a set of source devices on the first storage array to the target devices on the second storage array.

Illustrative embodiments can provide significant advantages relative to conventional data migration techniques. For example, challenges associated with the complexity of migrating data between storage resources are overcome in one or more embodiments by unifying multiple migration methodologies into a single host-based migration utility.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
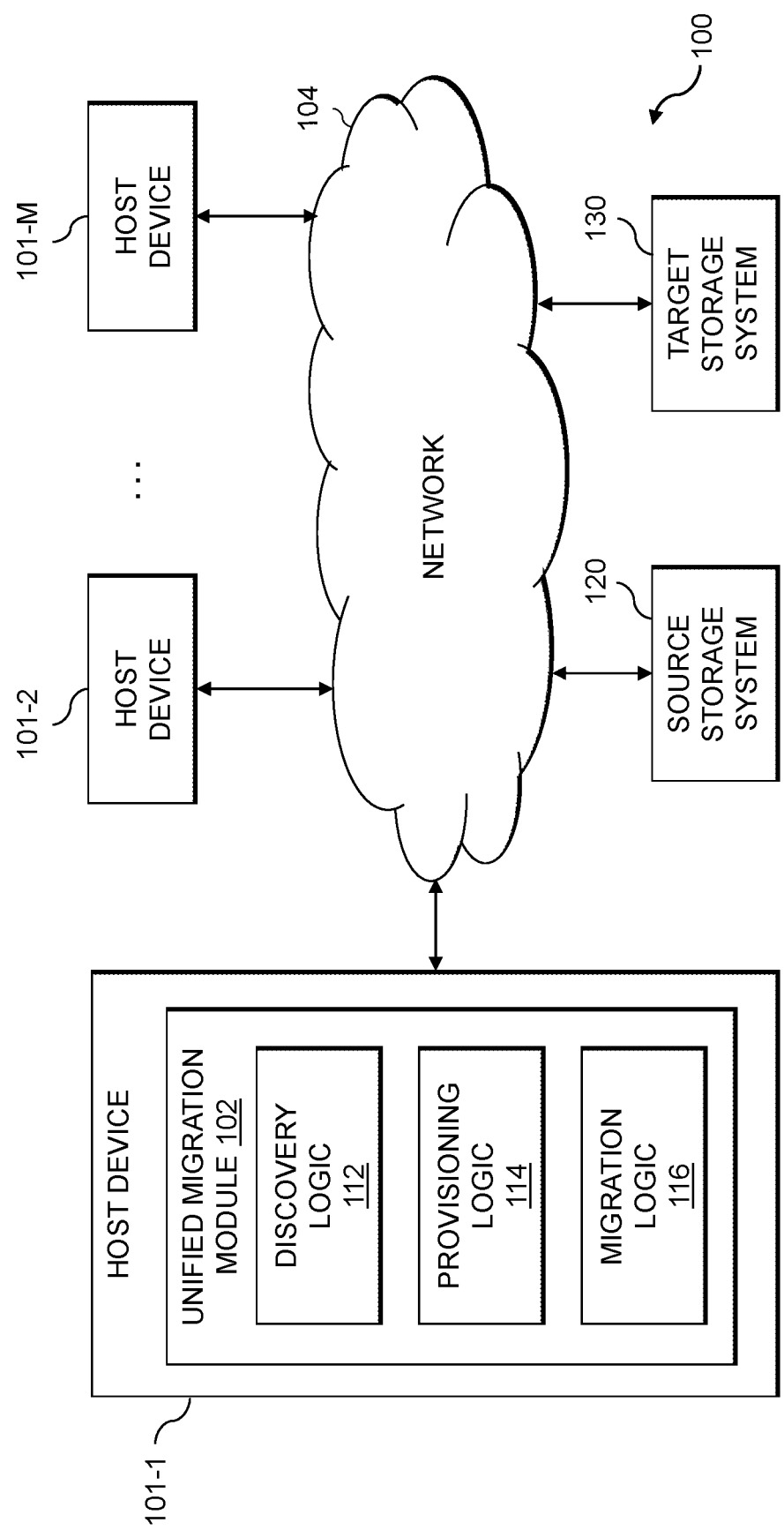
FIG. 1 shows an information processing system configured for unified host-based data migration in an illustrative embodiment.

FIG. 1 shows an information processing system 100 configured in accordance with an illustrative embodiment. The information processing system 100 comprises a plurality of host devices 101-1, 101-2, . . . 101-M, collectively referred to herein as host devices 101. The host devices 101 are configured to communicate with a source storage system 120 and a target storage system 130 over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate input-output (TO) operations that are processed by the source storage system 120 and/or the target storage system 130. The term "input-output" as used herein refers to at least one of input and output. For example, IO operations may comprise write requests and/or read requests directed to logical addresses of a particular logical storage volume of the source storage system 120 and/or the target storage system 130. These and other types of IO operations are also generally referred to herein as IO requests.

In the FIG. 1 embodiment, the host device 101-1 includes a unified migration module 102 comprising discovery logic 112, provisioning logic 114, and migration logic 116, which facilitate the migration of data from the source storage system 120 to the target storage system 130, as described in more detail elsewhere herein. Although not explicitly shown in FIG. 1, it is to be appreciated that one or more of the other host devices 101 may also include a unified migration module 102 in at least some embodiments.

The source storage system 120 illustratively comprises processing devices of one or more processing platforms. For example, the source storage system 120 can comprise one or more processing devices each having a processor and a memory, possibly implementing virtual machines and/or containers, although numerous other configurations are possible.

The source storage system 120 can additionally or alternatively be part of a cloud infrastructure such as an Amazon Web Services (AWS) system. Other examples of cloud-based systems that can be used to provide at least portions of the source storage system 120 include Google Cloud Platform (GCP) and Microsoft Azure.

The host devices 101 and the source storage system 120 may be implemented on a common processing platform, or on separate processing platforms. The host devices 101 are illustratively configured to write data to and read data from the source storage system 120 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The source storage system 120 comprises a plurality of storage devices and an associated storage controller. The storage devices store data of a plurality of storage volumes. For example, the storage volumes may illustratively comprise respective logical units (LUNs) or other types of logical storage volumes. It is noted that in the context of a Linux/Unix system, a volume relates to a Logical Volume Manager (LVM), which can be used to manage mass storage devices; a physical volume generally refers to a storage device or partition; and a logical volume is created by the LVM and is a logical storage device which can span multiple physical volumes. The term "storage volume" as used herein is intended to be broadly construed, and should not be viewed as being limited to any particular format or configuration.

The storage devices of the source storage system 120 illustratively comprise solid state drives (SSDs). Such SSDs are implemented using non-volatile memory (NVM) devices such as flash memory. Other types of NVM devices that can be used to implement at least a portion of the storage devices include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the source storage system 120.

It is therefore to be appreciated numerous different types of storage devices can be used in the source storage system 120 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the source storage system 120 illustratively comprises a scale-out all-flash distributed content addressable storage (CAS) system, such as an XtremIO™ storage array from Dell Technologies. A wide variety of other types of distributed or non-distributed storage arrays can be used in implementing the source storage system 120 in other embodiments, including by way of example one or more VNX®, VMAX®, Unity™ or PowerMax™ storage arrays, commercially available from Dell Technologies. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as NAS, storage area networks (SANs), direct-attached storage (DAS) and distributed DAS, as well as combinations of these and other storage types, including software-defined storage.

In some embodiments, communications between the host devices 101 and the source storage system 120 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the source storage system 120 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The host devices 101 are configured to interact over the network 104 with the source storage system 120. Such interaction illustratively includes generating IO operations, such as write and read requests, and sending such requests over the network 104 for processing by the source storage system 120. In some embodiments, each of the host devices 101 comprises a multi-path IO (MPIO) driver configured to control delivery of IO operations from the host device to the source storage system 120 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the source storage system 120.

The MPIO driver may comprise, for example, an otherwise conventional MPIO driver, such as a PowerPath® driver from Dell Technologies. Other types of MPIO drivers from other driver vendors may be used.

The source storage system 120 may further include one or more additional modules and other components typically found in conventional implementations of storage controllers and storage systems, although such additional modules and other components are omitted from the figure for clarity and simplicity of illustration.

In some embodiments, the source storage system 120 is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the source storage system 120 in such an embodiment collectively comprise at least a portion of the storage controller of the source storage system 120. For example, in some embodiments the sets of processing modules of the storage nodes collectively comprise a distributed storage controller of the distributed the source storage system 120. A "distributed storage system" as that term is broadly used herein is intended to encompass any storage system that is distributed across multiple storage nodes.

It is assumed in some embodiments that the processing modules of a distributed implementation of a storage controller are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of the source storage system 120 and/or the target storage system 130 illustratively comprises a CPU or other type of processor, a memory, a network interface card (NIC) or other type of network interface, and a subset of the storage devices, possibly arranged as part of a disk array enclosure (DAE) of the storage node. These and other references to "disks" herein are intended to refer generally to storage devices, including SSDs, and should therefore not be viewed as limited to spinning magnetic media.

The source storage system 120 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the source storage system 120, or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the source storage system 120 to reside in different data centers. Numerous other distributed implementations of the host devices 101 and the target storage system 130 are possible.

In the FIG. 1 embodiment, the target storage system 130 may be implemented in any one of the ways described above with respect to source storage system 120. In at least some embodiments, the source storage system 120 and the target storage system 130 implement at least one different type of storage array.

Additional examples of processing platforms utilized to implement host devices 101, source storage system 120, and target storage system 130 in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 101, unified migration module 102, source storage system 120, target storage system 130, and network 104 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

An exemplary process utilizing unified migration module 102 will be described in more detail with reference to the flow diagram of FIG. 4.

As noted above, a data migration is typically a complex process that often impacts system availability due to, for example, service interruptions and/or down time. For example, a typical migration may involve a user performing a set of commands dependent on the particular migration methods, operating systems, and volume managers involved. As such, migrations are often inefficient and susceptible to user mistakes.

Exemplary embodiments described herein provide a host-based migration utility that maintains a unified process structure regardless of the operating systems or volume managers involved in the migration. According to one or more embodiments, the unified host-based migration utility is operating system-agnostic and allows a user to accurately migrate data from a first type of storage system to a second type of storage system without disruption even when the user has little knowledge of the operating systems or host-based migration methodologies involved. Additionally, one or more embodiments automate the target array provisioning process based on a representational state transfer application programming interface (REST API). Further, at least one example embodiment provides a simplified graphical user interface (GUI) for configuring the migration process and for monitoring and reporting of migrations that are completed or currently being executed.

Figure 2:
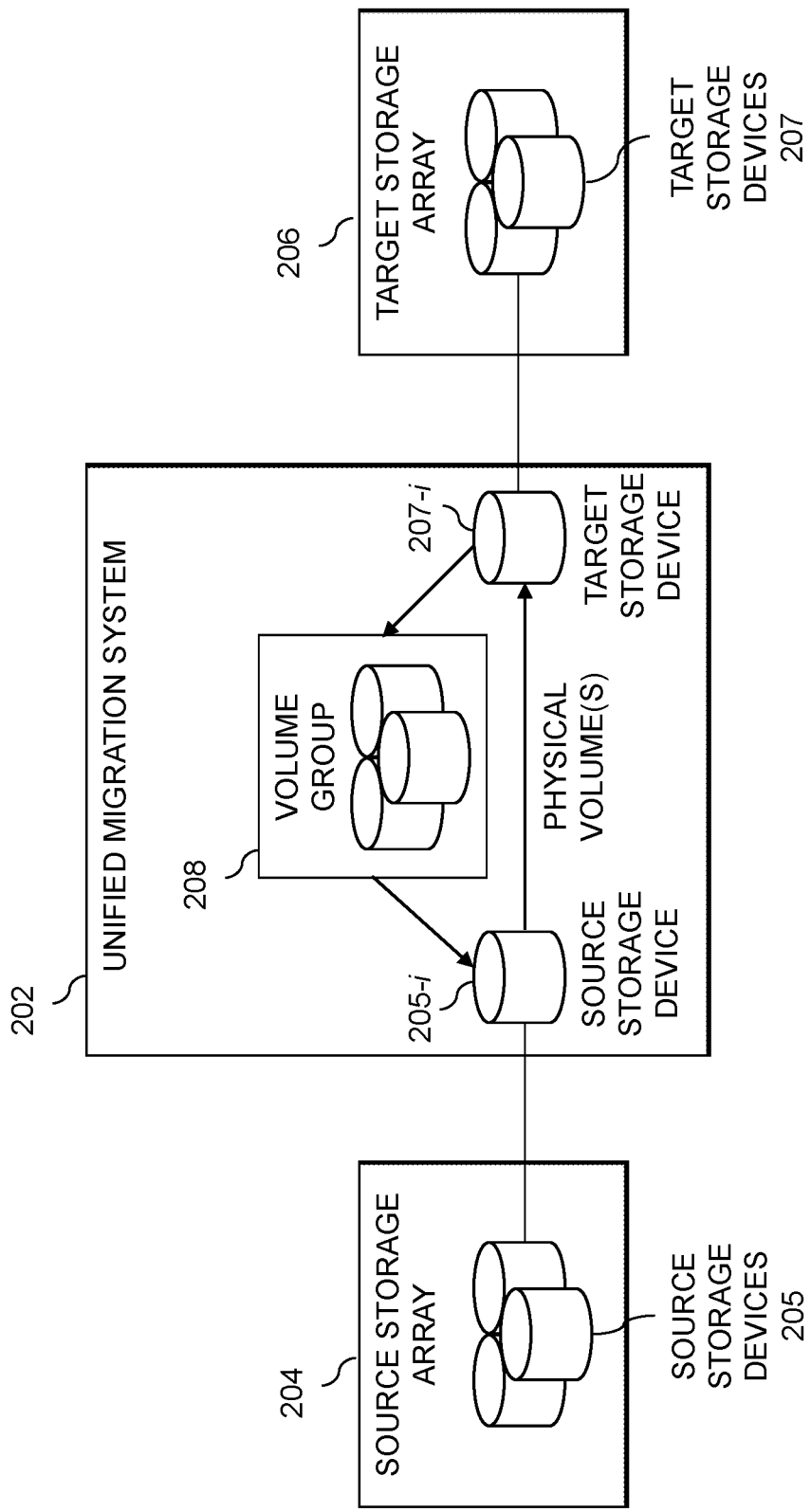
FIG. 2 shows an example architecture in an illustrative embodiment.

FIG. 2 shows an example of a unified host-based data migration architecture in an illustrative embodiment. FIG. 2 includes a unified migration system 202, a source storage array 204, and a target storage array 206, which, in at least some embodiments, correspond to, unified migration module 102 of host device 101-1, source storage system 120, and target storage system 130, respectively.

Generally, the unified migration system 202 discovers and obtains information pertaining to the source storage array 204. For example, the information may include the number and sizes of source storage devices 205, identifiers (e.g., volume/disk group information), and information about the type of storage array (e.g., vendor information).

The unified migration system 202 creates new target storage devices 207 on the target storage array 206 based on the obtained information pertaining to the source storage array 204. In at least some examples, each of the source storage devices 205 and each of the target storage devices 207 may correspond to a LUN. The unified migration system 202 provisions the target storage devices 207 to the host (e.g., host device 101-1) and verifies that the newly created target storage devices 207 meet the necessary size requirements. The provisioning may include adding, mapping, masking, and/or presenting the new target devices 207 to the host device 101-1, for example.

The unified migration system 202 initiates the migration process, which may include copying data from a given source storage device 205-$i$ to a corresponding target storage device 207-$i$. In the example shown in FIG. 2, the source storage device 205-$i$ belongs to a volume group 208. The unified migration system 202 copies one or more physical volumes corresponding to the source storage device 205-$i$ to the corresponding target storage device 207-$i$. If successfully copied, the target storage device 207-$i$ is then added to the volume group 208, and the migration process is cleaned up, such as, for example, by removing the source storage device 205-$i$ from the volume group 208. Additionally, the source storage device 205-$i$ may be unmounted, deleted, and/or unmapped from the source storage array 204.

Figure 3:
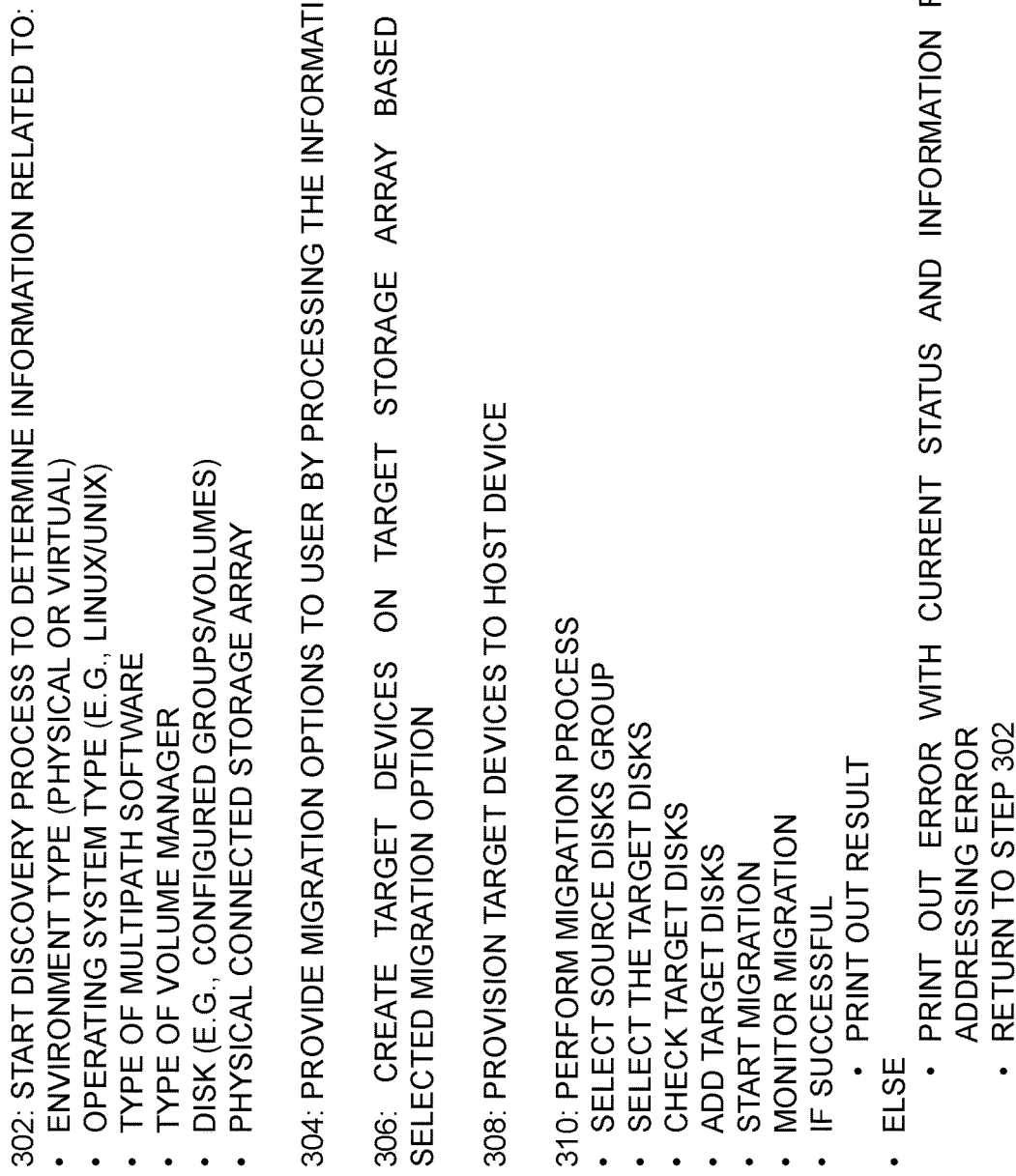
FIG. 3 shows example pseudocode in accordance with an illustrative embodiment.

FIG. 3 shows example pseudocode for implementing at least a portion of a unified host-based migration technique in an illustrative embodiment. In this embodiment, example pseudocode 300 is executed by or under the control of at least one processing system and/or device. For instance, the example pseudocode 300 may be viewed as comprising a portion of a software implementation of at least part of the unified migration module 102 including its logic 112, 114, and 116 of the FIG. 1 embodiment.

Step 302 of example pseudocode 300 includes starting a discovery process to determine information pertaining to: the environment type (physical or virtual), operating system type (e.g., Linux/Unix), a type of multipath software, a type of volume manager, disks (e.g., configured groups/volumes), and the physical connected storage array. Step 304 includes providing candidate migration options to a user based on the information obtained during the discovery process. Step 306 includes creating target devices on a target storage array in accordance with a migration option selected by the user. Step 308 includes provisioning the created target devices to a host device.

Step 310 includes performing a migration process. The migration process selects a volume group of source disks, selects corresponding target disks, and checks that the target disks satisfy the size requirements for migrating data from the source disks to the target disks. The target disks are added to the volume group and the data is migrated from the source disks to the target disks. The migration process is monitored, and if successful the result of the migration process is output to the user. If the migration is not successful, then an error is output to the user with the current status of the migration, and the pseudocode 300 returns to the discovery process at step 302. Optionally, the pseudocode 300 also outputs information to the user for addressing the error. Such information may include, for example, which source disk migration processes failed and any OS (operating system) related error. Additionally, the relation between the source disk and the respective target disk on which the migration process failed may be cut and the data on the source disk may be retained.

It is to be appreciated that this particular example pseudocode 300 shows just one example implementation of a portion of a unified host migration process technique, and alternative implementations of the process can be used in other embodiments.

As a non-limiting example, consider a user that wishes to migrate from a Unity storage array to a VMAX storage array using a Linux operating system and native multi-path control. One or more exemplary embodiments determine the appropriate commands to be applied to accomplish this migration. In this example, a discovery process discovers the physical volumes that are currently being implemented by the Unity storage array, the corresponding sizes, and the volume groups using at least the following commands: fdisk -l, parted, pvs, vgs, and multipath -l. The results are analyzed, and target devices are created on the VMAX storage array and provisioned to the host device in an automated manner based at least in part on REST API calls associated with the target storage array. In this example, the creation of new physical volumes may be automated based on the results of pvcreate and vgextend commands. The migration of the volumes is also automated from the source devices to the newly created target devices. As an example, one-to-one migration (e.g., migration from a source physical volume to a target physical volume) can be accomplished based on a pvmove command or other similar command. It is to be appreciated that this is merely one example, and a different set of commands will be used depending on the discovered information (e.g., the types of storage arrays, operating systems, etc.).

Figure 4:
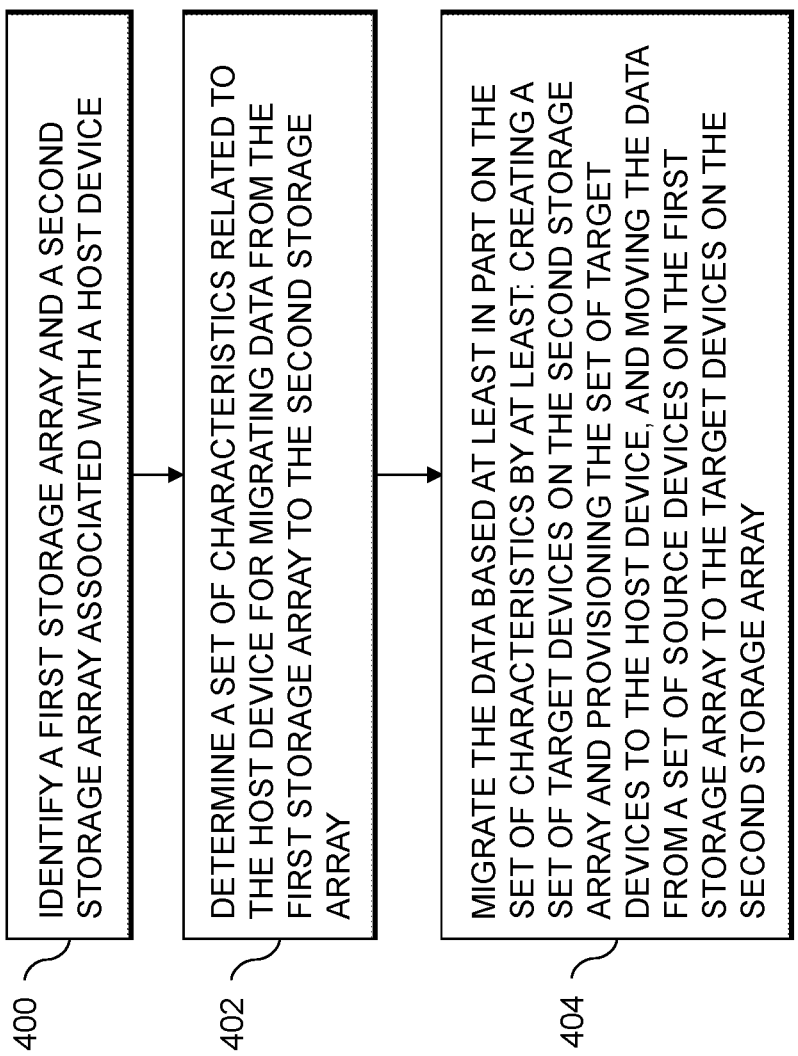
FIG. 4 is a flow diagram of a storage optimization process for unified host-based data migration in an illustrative embodiment.

FIG. 4 shows an example of a process for unified host-based data migration in illustrative embodiments. It is to be understood that this particular process is only an example, and additional or alternative processes can be carried out in other embodiments.

In this embodiment, the process includes steps 400 through 404. These steps are assumed to be performed, at least in part by, the host device 101-1 utilizing its unified migration module 102. Step 400 includes identifying a first storage array and a second storage array associated with a host device. Step 402 includes determining a set of characteristics related to the host device for migrating data from the first storage array to the second storage array. Step 404 includes migrating the data based at least in part on the set of characteristics, wherein the migrating comprises: creating a set of target devices on the second storage array and provisioning the set of target devices to the host device; and moving the data from a set of source devices on the first storage array to the target devices on the second storage array.

The set of characteristics may be indicative of at least one of: a type of environment; a type of operating system; a type of volume manager; a type of multipath software; and a configuration of the first storage array. The type of the environment may include one of a virtual environment and a physical environment. The type of multipath software may include at least one of: native multipath software; SCSI multipath software; and vendor-specific multipath software. The configuration of the first storage array may be indicative of one or more of: a number of devices in the set of source devices; a name of each source device in the set; a size of each source device in the set; and one or more volume groups associated with the first storage array. The provisioning may be automated based on a REST API. The migrating may be further based on a type of the first storage array and a type of the second storage array, wherein the type of the first storage array is different than the type of second storage array. The type of the first storage array and the type of the second storage array may be based on at least one of a storage array vendor and a storage array product. The process depicted in FIG. 4 may further include a step of: in response to a successful completion of said migrating, removing the one or more source devices from the host device. The process depicted in FIG. 4 may be performed using a migration utility that is executable on a plurality of different operating system types.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional migration approaches. For example, some embodiments are configured to efficiently facilitate block data migration, consolidation, and segregation methodologies across different operating systems using a unified host-based migration utility, even when the user has little prior knowledge or experience. Additionally, at least some example embodiments provide an improved migration management GUI that is capable of handling multiple different migrations at the same time. These and other embodiments can effectively reduce downtime and service outages, and eliminate user mistakes that are common in conventional migration techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for unified host-based migration will now be described in greater detail with reference to FIGS. 5 and 6. Although described in the context of system 100, these platforms may also be used to implement at least portions of other information processing systems in other embodiments.

Figure 5:
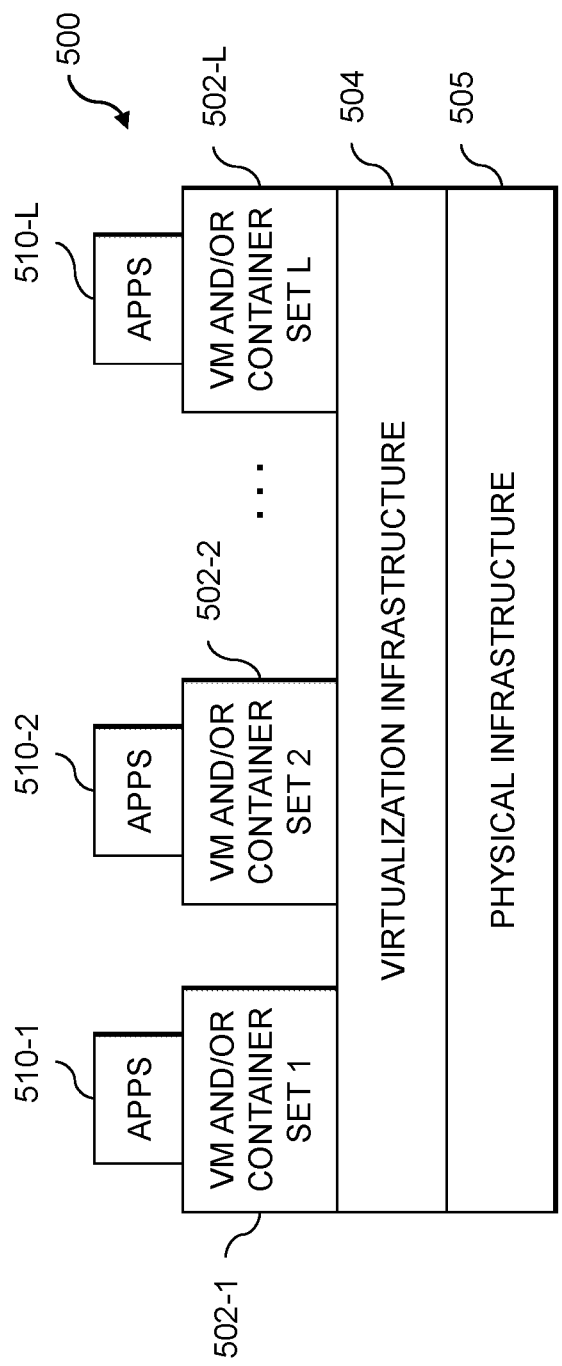
FIGS. 5 and 6 show examples of processing platforms that may be utilized to implement at least a portion of an information processing system in illustrative embodiments.
Figure 6:
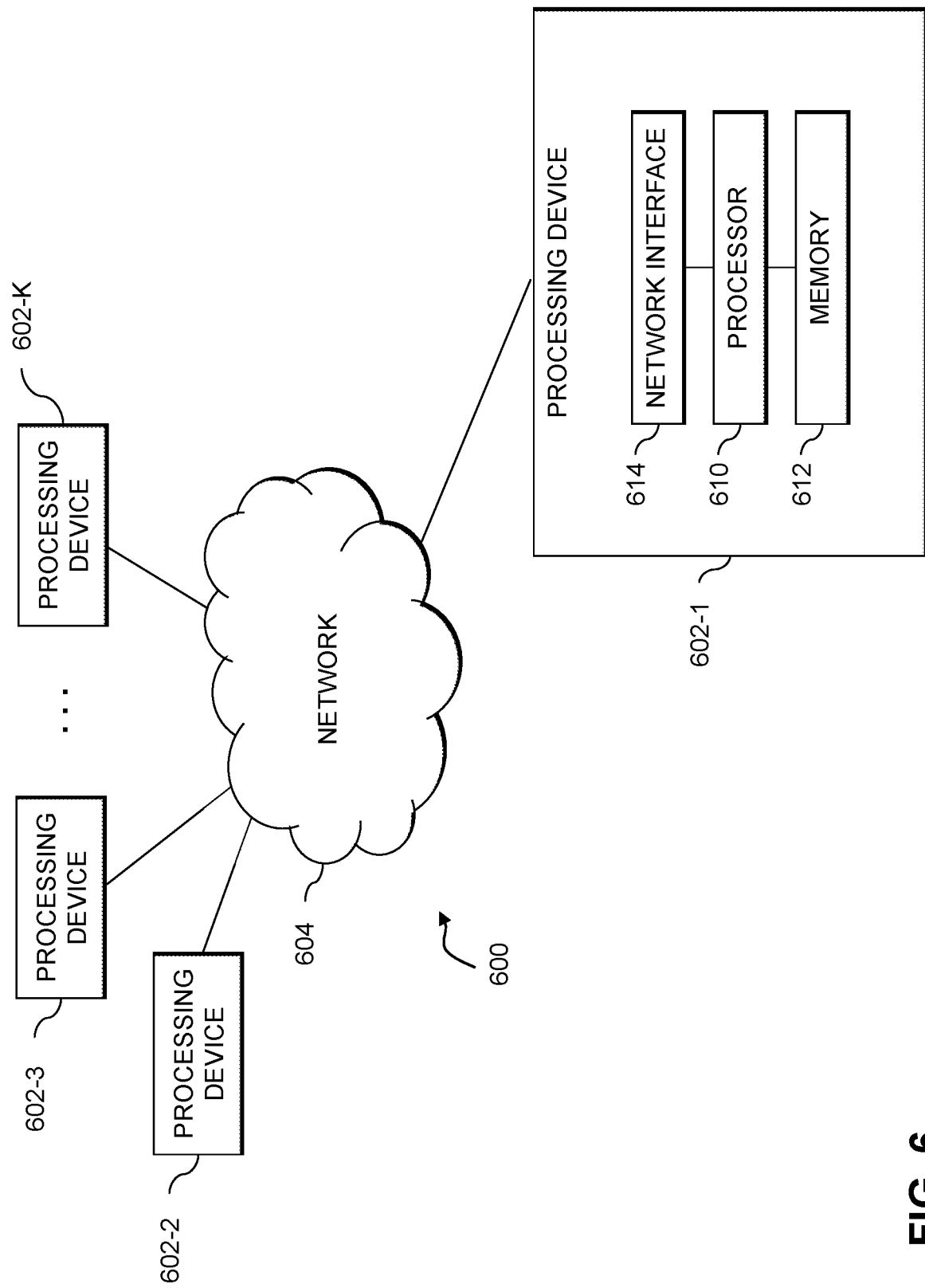

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide functionality for unified host-based migration of the type described above using one or more processes running on a given one of the VMs. For example, each of the VMs can implement unified migration module 102 and/or other components for implementing functionality for unified host-based migration in the host devices 101.

A hypervisor platform may be used to implement a hypervisor within the virtualization infrastructure 504. Such a hypervisor platform may comprise an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide functionality for unified host-based data migration of the type described above. For example, a container host device supporting multiple containers of one or more container sets can implement one or more instances of the unified migration module 102, and/or other components for implementing functionality for unified host-based data migration.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise RAM, read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell Technologies.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for unified host-based data migration as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage devices, storage controllers, and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   identifying a first storage array and a second storage array associated with a host device;
   determining a set of characteristics related to said host device for migrating data from the first storage array to the second storage array; and
   migrating the data based at least in part on the set of characteristics, wherein said migrating comprises:
      creating a set of target devices on the second storage array and provisioning the set of target devices to the host device; and
      moving the data from a set of source devices on the first storage array to the target devices on the second storage array;
   wherein the method is performed by at least one processing device comprising a processor coupled to a memory.

2. The computer-implemented method of claim 1, wherein the set of characteristics is indicative of at least one of:
   a type of environment;

a type of operating system;
a type of volume manager;
a type of multipath software; and
a configuration of the first storage array.

3. The computer-implemented method of claim 2, wherein the type of the environment comprises one of a virtual environment and a physical environment.

4. The computer-implemented method of claim 2, wherein the type of multipath software comprises at least one of:
 native multipath software;
 small computer system interface multipath software; and
 vendor-specific multipath software.

5. The computer-implemented method of claim 2, wherein the configuration of the first storage array is indicative of one or more of:
 a number of devices in the set of source devices;
 a name of each source device in the set;
 a size of each source device in the set; and
 one or more volume groups associated with the first storage array.

6. The computer-implemented method of claim 1, wherein said provisioning is automated based on a representational state transfer application programming interface.

7. The computer-implemented method of claim 1, wherein said migrating is further based on a type of the first storage array and a type of the second storage array, wherein the type of the first storage array is different than the type of second storage array.

8. The computer-implemented method of claim 7, wherein the type of the first storage array and the type of the second storage array corresponds to at least one of a storage array vendor and a storage array product.

9. The computer-implemented method of claim 1, further comprising:
 in response to a successful completion of said migrating, removing the one or more source devices from the host device.

10. The computer-implemented method of claim 1, wherein the method is performed using a migration utility that is executable on a plurality of different operating system types.

11. A non-transitory processor-readable storage medium having stored therein program code of one or more software programs, wherein the program code when executed by at least one processing device causes the at least one processing device:
 to identify a first storage array and a second storage array associated with a host device;
 to determine a set of characteristics related to said host device for migrating data from the first storage array to the second storage array; and
 to migrate the data based at least in part on the set of characteristics, wherein said migration comprises:
  creating a set of target devices on the second storage array and provisioning the set of target devices to the host device; and
  moving the data from a set of source devices on the first storage array to the target devices on the second storage array.

12. The non-transitory processor-readable storage medium of claim 11, wherein the set of characteristics is indicative of at least one of:
 a type of environment;
 a type of operating system;
 a type of volume manager;
 a type of multipath software; and
 a configuration of the first storage array.

13. The non-transitory processor-readable storage medium of claim 12, wherein the type of the environment comprises one of a virtual environment and a physical environment.

14. The non-transitory processor-readable storage medium of claim 12, wherein the type of multipath software comprises at least one of:
 native multipath software;
 small computer system interface multipath software; and
 vendor-specific multipath software.

15. The non-transitory processor-readable storage medium of claim 12, wherein the configuration of the first storage array is indicative of one or more of:
 a number of devices in the set of source devices;
 a name of each source device in the set;
 a size of each source device in the set; and
 one or more volume groups associated with the first storage array.

16. The non-transitory processor-readable storage medium of claim 11, wherein said provisioning is automated based on a representational state transfer application programming interface.

17. The non-transitory processor-readable storage medium of claim 11, wherein said migrating is further based on a type of the first storage array and a type of the second storage array, wherein the type of the first storage array is different than the type of second storage array.

18. The non-transitory processor-readable storage medium of claim 17, wherein the type of the first storage array and the type of the second storage array corresponds to at least one of a storage array vendor and a storage array product.

19. The non-transitory processor-readable storage medium of claim 11, wherein the program code when executed by the at least one processing device causes the at least one processing device:
 in response to a successful completion of said migrating, removing the one or more source devices from the host device.

20. An apparatus comprising:
 at least one processing device comprising a processor coupled to a memory;
 the at least one processing device being configured:
 to identify a first storage array and a second storage array associated with a host device;
 to determine a set of characteristics related to said host device for migrating data from the first storage array to the second storage array; and
 to migrate the data based at least in part on the set of characteristics, wherein said migration comprises:
  creating a set of target devices on the second storage array and provisioning the set of target devices to the host device; and
 moving the data from a set of source devices on the first storage array to the target devices on the second storage array.

* * * * *